Inventors:
Hugo A. Hamerly and
Seymour H. Wright

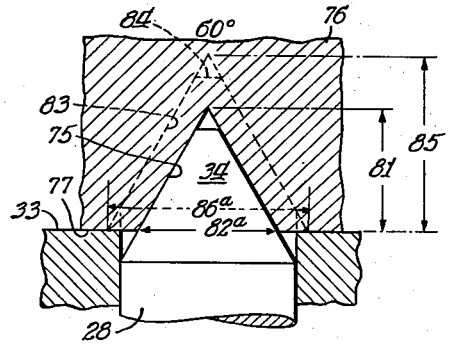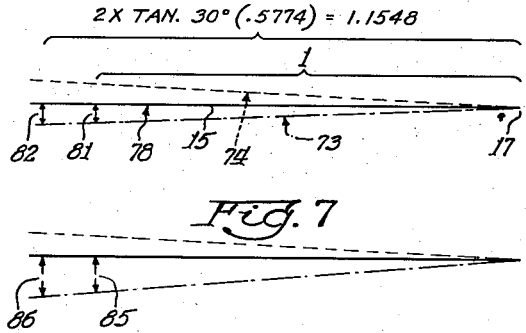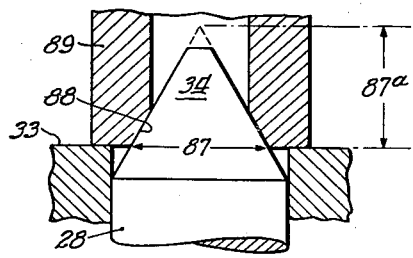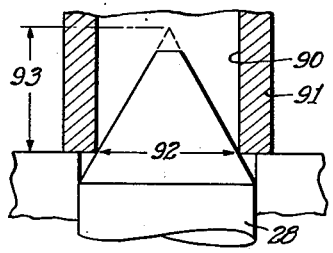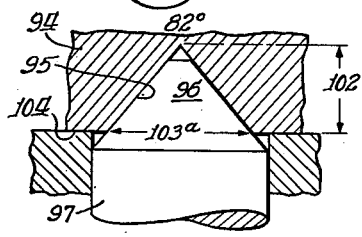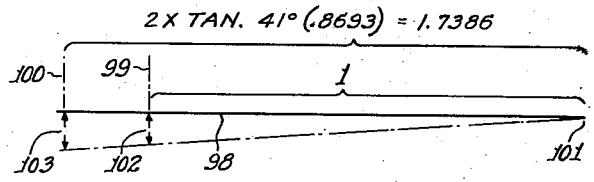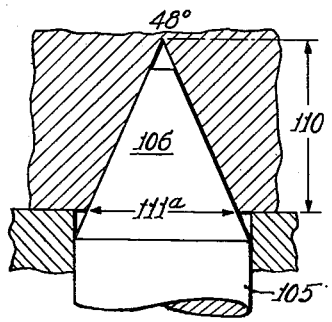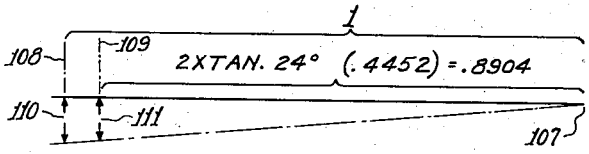

Patented June 17, 1952

2,600,498

UNITED STATES PATENT OFFICE 2,600,498

DEVICE FOR GAUGING RECESS DIAMETERS

Hugo A. Hamerly and Seymour H. Wright, Chicago, Ill.; said Wright assignor to said Hamerly Application February 27, 1948, Serial No. 11,687

10 Claims. (Cl. 33—178)

1

This invention relates to a gauge device more particularly for determining the depth or diameter or both of center recesses in machine-turned articles such as of cylindrical shape in the production of which the article is held by a center at each end while being machined by the usual tool for that purpose.

Since the article is located on the centers by means of the center recesses at each end of the article, these recesses being conoidal to correspond with the conoidal points of the center elements, great accuracy is necessary in the forming of the center recesses to permit accurate machining for high precision work.

The invention provides a gauge device for measuring the diameters of figures with reference to which the diameter to be measured is the base of an isosceles triangle, the device including a gauge pin adapted to travel a distance equal to an element of the triangle, and means for translating the distance of movement of the gauge pin into measurement on an instrument of the said diameter, said means including mechanism having correlated parts related in a ratio predetermined by a trigonometric function of an angle of the isosceles triangle.

As is well known, the center points and correspondingly the center depressions usually define cones of 60 degrees taper. It is also well known that a plane perpendicular to the axis of such a cone defines along the plane of the axis, an isosceles triangle in cross-section, and in the case of a 60° cone an equilateral triangle, the line perpendicular to the axis representing an element of the triangle such as the base of the triangle and the axis representing an element of the triangle such as the altitude of the triangle. It is also well known by the laws of trigonometry that the length of the altitude of an isosceles triangle bears a fixed relation to the length of the base, or in other words is a constant, for a given included angle at the apex.

Starting this another way, the tangent of a 30 degree angle (one-half of 60° at the apex) is .5774. Consequently by measuring the depth of a 60° center recess (or altitude of the triangle) and multiplying this by twice .5774, the diameter of the recess (or base of the triangle) at the plane of the end surface of the article may be found.

Among other objects the present invention aims to provide a compact, inexpensive, and accurate gauge device of this type which can be used on a table-top or the like and to which the articles may be brought conveniently and rapidly,

2 and successively submitted to the gauge, which will indicate on a dial readable at a glance the diameter of the center recess at the end surface of the articles, the measurement directly taken by the gauge, in the present illustrative embodiment of the invention, being the depth of the recess and means being provided for translating this measurement of depth into measurement of diameter, means being still further provided for the reading of the measurement of diameter directly in thousandths of an inch.

Again generally, the device may be usefully employed to read the diameters of regular shaped openings of various kinds, by means of a cone-point gauge pin.

These and other objects and advantages will be apparent from the following description, taken together with the accompanying drawings, of an illustrative embodiment of the invention, and in which drawings—

Figure 4 is a fragmentary front vertical section similar to Fig. 1 but showing the zero position of the parts and dial hands;

Figure 5 is a greatly enlarged sectional view of the gauge pin nose and a recess to be measured, an alternative recess being indicated in dotted lines;

Figures 6 and 7 are diagrams indicating the function of the gauge lever in measuring the diameters of the conical recesses of Fig. 5;

Figure 8 shows the use of the device to measure a flared counterbore;

Figure 9 shows measurement of a straight bore;

Figures 10 and 11 illustrate modifications of the device to handle recesses of 82° conical taper; and Figures 12 and 13 modifications for recesses of 48° conical taper.

Figure 1:
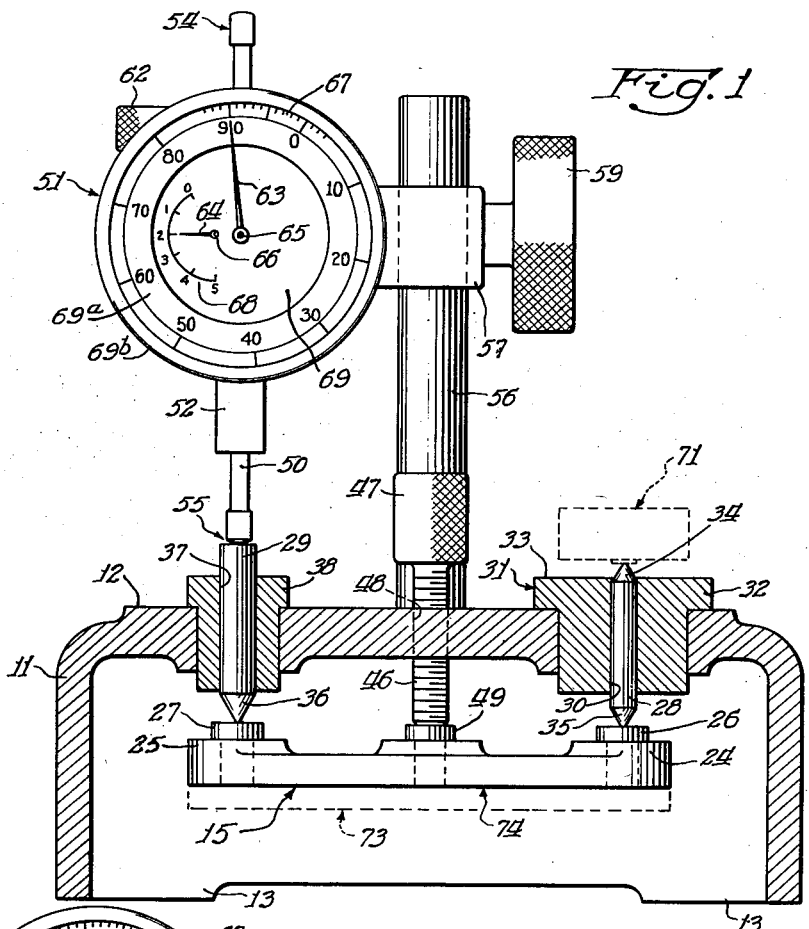
Figure 1 is a vertical sectional view, partly in elevation, of a gauge device embodying the invention, showing in full lines one position of the parts and in broken lines other positions.
Figure 2:
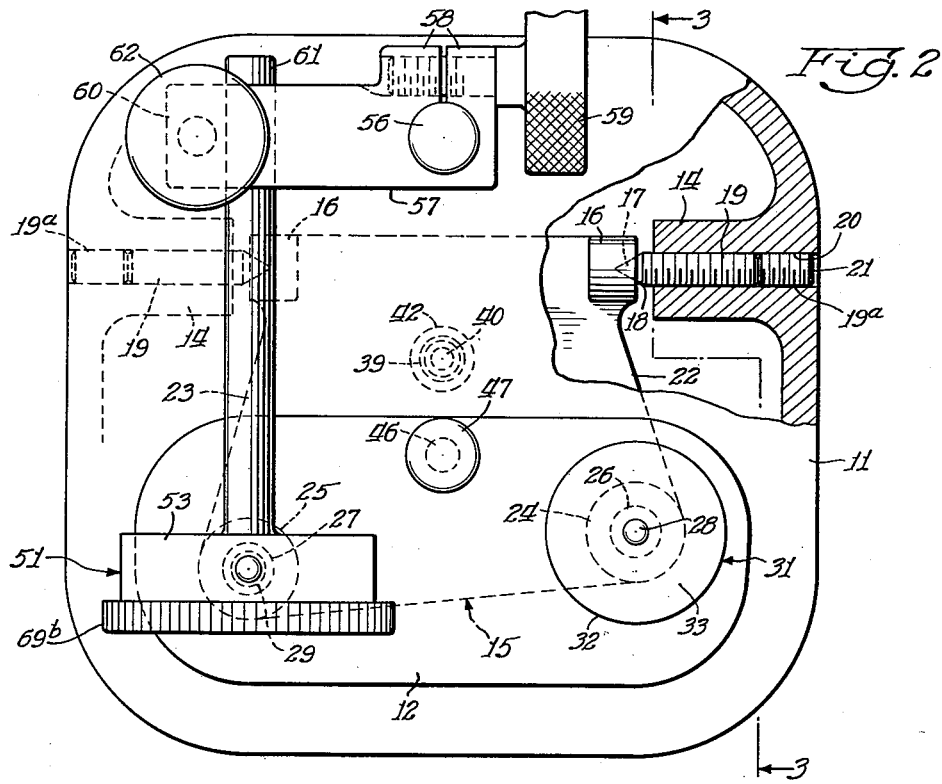
Figure 2 is a plan view of the structure of Fig. 1, partially in section for clearness of description.

Referring in detail to the illustrative construction shown in the drawings, the numeral 11 indicates a base for the device which is advantageously in the form of a hollow inverted metal casing serving the further purpose of housing operative parts of the gauge device, the upper surface of the base 11 affording a platform 12, and the lower edges of the base constituting feet 13.

In accordance with the present invention, the hollow base has interior bosses 14 inwardly and oppositely directed and providing bearings for a lever 15 of the third class in the sense that both arms of this lever extend in the same direction from the pivot or fulcrum and the effort is between the fulcrum and the resistance as will be later explained. The lever 15 is conveniently in the form of a platen and has a fulcrum pivot in the form of a pair of trunnions 16 having oppositely facing conical cavities 17 therein which receive the conical journal ends 18 of pivot pintles 19 which are in the form of headless screws threaded into tapped bores 20 in the bosses 14. The bores 20 are shown open at the exterior of base 11 so that another headless set-screw 19a may be threaded into each bore and a screwdriver or other tool may be inserted in a kerf 21 in the outer end of the set-screws 19a to fix the positions of the pintles for proper but free pivoting of the lever thereon.

Further in accordance with the present invention, the lever arms on the same side of the fulcrum already referred to are represented by respective sides of the lever platen, these sides being numbered 22 and 23 and terminating respectively at different distances from the fulcrum. Adjacent their ends the arms have palms 24 and 25 from which rise land pads or buttons 26 and 27 in each case. The distance from the center of the land button 26 to the pivot 17 (which distance represents the length of the lever arm 22) is less than the distance from the center of the land button 27 to the lever pivot 17 (which distance represents the length of the lever arm 23).

Still further in accordance with the present invention, in contact with the land buttons 26 and 27 respectively are vertically reciprocable pins 28 and 29, which are arranged to follow the lever in its movement. For this purpose the gauge pin 28 is freely slidable in a smooth vertical bore 30 in the bushing 31 carried by the top wall of the casing 11, the bushing having enlargement 32 which laps and projects above the casing platform 12 and providing a rostrum surface 33. The upper end of the gauge pin 28 is conoidal as at its nose 34 on a 60 degree taper in the present instance. At its lower end the gauge pin 28 is also conoidal as at 35 and rests on the button 26. Thus if the gauge pin 28 is pressed downwardly the lever 15 will be swung downwardly on its pivot fulcrum 17, the lower end of the gauge pin sliding on the button 26 during such movement to compensate for the arcuate movement of the lever; that is, the vertical axis of the gauge pin will be displaced relatively toward the outer end of the arm 22 as the lever moves downwardly.

Accompanying this downward swinging movement of lever 15 under the influence of downward movement of gauge pin 28 is a consequent downward movement of the indicator pin 29 that in turn has a conoidal lower end 36 in contact with the land button 27 of the arm 23. Here again, as the button 27 moves arcuately in the arcuate movement of the arm 23, the pointed lower end 36 of the indicator pin 29 is displaced relatively outwardly of the button 27, sliding on the surface of the button. In its downward movement the indicator pin 29 moves freely in the smooth bore 37 of a bushing 38 carried by the upper wall of the casing 11. In the reverse or upward movement of the lever 15, the pointed lower ends of the pins 28 and 29 slide on the land buttons being displaced relatively inwardly of the lever arms in the arcuate movement of the latter. In all of these movements, the arms 22 and 23 being rigid with the lever platen, move together. The reduced or conical lower ends of the gauge and indicator pins minimize friction between them and the land buttons.

The lever 15 and with it the gauge pin 28 and indicator pin 29 are urged upwardly by a helical compression spring 39 carried on a spring bolt 40 depending within the casing and screw-threaded into a tapped boss 41 on the underface of the platform 12 as at 42. At its lower end the spring bolt has a head 43 against which the spring 39 abuts at its lower end, the upper end of the spring entering a counterbore 44 in the perforation 45 in the platen of the lever 15 through which the spring bolt loosely passes, with sufficient clearance to prevent interference with the lever.

Figure 3:
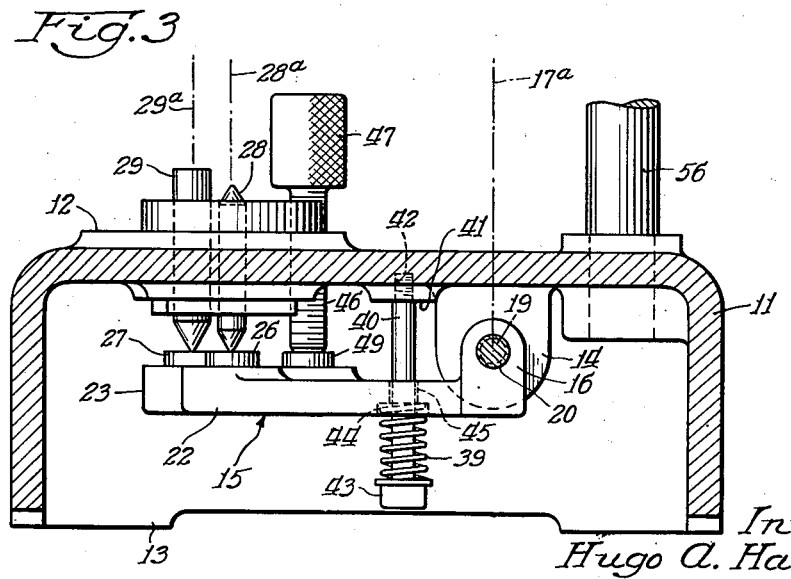
Figure 3 is a side vertical section taken on the line 3—3 of Fig. 2, upper parts being omitted.

The spring 39 is placed under compression by downward movement of the lever 15 and selective adjustment of such compression is provided by an adjusting screw 46 having a knurled knob 47 and which is screw-threaded into a tapped passageway 48 in the platform 12, the lower end of the adjusting screw 46 abutting a button 49 on the lever 15. In practice, the adjusting screw 46 may be screwed downwardly until the lever 15 is approximately horizontal, as shown in Fig. 3 and in full lines in Fig. 1. The knurled head 47 affords a grip for the thumb and forefinger of the user for making this initial adjustment as well as subsequent adjustments which may be desirable as pointed out later.

To permit the reading of the movements of the indicator pin 29, the latter is pressed upon by the plunger 50 of a standard gauge dial instrument indicated generally by the numeral 51. The plunger 50 slides in a sleeve 52 carried by the instrument casing 53, through which the plunger projects above as at 54, the plunger sliding through the casing. The gauge instrument 51 contains the usual internal mechanism for such devices, which form no part of the present invention and need not be here described, it being understood that such mechanism includes spring means for urging the plunger 50 outwardly, or in this case downwardly at all times against the indicator pin 29 as at 55.

The gauge instrument 51 is shown mounted on a post 56 upstanding from the platform 12 and upon which is vertically slidable a link 57 having bifurcate jaws 58 through which pass a clamping screw 59 to fix the position of the link 57 vertically on the post 56. At its other end, the link 57 is again bifurcate in a transverse direction by having the jaws 60 which grip the instrument leg 61 extending rigidly from the back face of the gauge instrument casing 53, a clamping screw 62 again serving to fix the position of the leg 61 relatively to the link 57. This link and clamp provides a universal joint mounting adjustment for the instrument 51.

The dial instrument 51 is arranged to read in thousandths of an inch and for this purpose has a thousandth hand 63 and a smaller hand 64, each arranged to swing about pivot points 65 and 66 respectively comprising the usual pointer hand spindles geared for rotation in response to reciprocation of the dial plunger 50. The hand 63 swings about the larger dial face figures 67 reading from zero and around the circle back thereto, one complete revolution of the hand 63 around this scale measuring a distance of .100 inch, the dial being scaled in increments of .010 inch. The smaller hand 64 is adapted to cooperate with the arcuate scale 68 beginning with zero and scaled in increments of .100 (indicated by the figure 1 on the arcuate scale) inch up to, say, .500 inch, each revolution of the hand 63 being accompanied by an arcuate movement of the hand 64 from 0 to 1, or from 1 to 2, etc. Thus the dial instrument will register distances of movement of the plunger 50 from 0 inch to as much as .500 inch.

The dial casing 53 carries not only the stationary dial face 69 but also a rotatable dial face 69a, the latter including a rotatable annulus 69b, desirably having a knurled periphery to facilitate rotation, which carries the dial face rotatable portion 69a upon which the large or thousandths of an inch (67) scale of the dial appears, that is the scale with which the hand 63 registers. This annular rotatable dial face portion 69a slides in rotation on the central dial portion 69 that carries the smaller or arcuate scale.

Following, now, the present invention, the gauge device is set by depressing the gauge pin 28 until the apex (produced) of the conoidal upper end 34 of the gauge pin 28 is flush with, i. e. just in the plane of the rostrum surface 33. The conoid 34 is formed so that every cross-sectional area thereof is of a known diameter. Since it is not practical by reason of wear, etc., to make so sharp a point on the gauge pin as would be necessary in bringing it to an exact cone point, the point is conveniently slightly truncate at 70, and to compensate for this truncation, the gauge set block 71 has a small cylindrical boss 72 on its gauge face 72a, the vertical height of this boss 72 being exactly the distance by which the gauge pin upper end is truncated. Thus, when the gauge set block 71 (as shown diagrammatically in dotted lines in Fig. 1) is pressed down first onto the gauge pin 28 and then onto the rostrum 33 with the boss 72 of the block in the bore 30 for the gauge pin 28, the latter is depressed exactly to the position which it would occupy if it had an exactly sharp extremity and this extremity were brought into exactly flush relationship with the rostrum surface 33. This having been done as shown in Fig. 4, the dial annulus 69b is then rotated to rotate the annular dial face 69a to bring the zero of the large dial scale into register with the large hand 63, wherever the latter may be. At this time also the instrument is arranged so that the small hand 64 is similarly at zero on its scale, as shown in Fig. 4. It will of course be understood that any depression of the gauge pin 28 is accompanied by depression of the indicator pin 29, since they are both maintained in contact with the lever 15, the spring urged plunger 50 following the indicator pin 29 and the dial registering the movement of the indicator pin.

The zero position of the lever 15, which carries both the gauge pin and indicator pin, is shown in full lines in Fig. 4 and is also indicated by the broken line at 73 in Fig. 1. In the latter figure also the initial position of the gauge set block 71 is indicated in broken lines when it is temporarily pressed upon the gauge pin 28 to depress the latter to the position shown in Fig. 4 to the zero position and held there while the dial instrument annulus 69b is set to register zero with the dial hands. When this has been done, the gauge set block 71 is now removed and the lever 15 is allowed to rise (from its zero position 73, Fig. 1) under the influence of the compression spring 39 to the limit (as at 74 Fig. 1) of its upward movement permitted in this instance by the adjusting screw 46. The latter, as here shown, has been set by its knurled knob 47 at a position which may be assumed, for purposes of illustration, to indicate relative upward movement of the indicator pin 29 from the zero position shown in Fig. 4 through a distance of say .190 inch, or just a little short of two hundred thousandths of an inch. It will be understood that in this upward movement of the lever arm 15, permitting a movement of the indicator pin 29 of .190 inch, the gauge pin 28 will have moved a less distance, i. e. a distance which will bear the relation to .190 inch that the distance from the axis 28a of the gauge pin 28 (Fig. 3) to a line 17a parallel with the pin axes and passing through the lever fulcrum 17 bears to the distance from the axis 29a of the indicator pin to the line 17a.

In the present illustration, the gauge device is arranged to measure the diameter of recesses having a 60° taper. For this angle of 60°, the ratio of the distance 28a—17a to the distance 29a—17a is as the ratio of 1 to 2 times tangent 30° (or one-half the 60° degree included angle of the recess). Consequently if the movement of the gauge pin 28 is .164 inch, the movement of the indicator pin 29 is .190 inch, since the latter equals 2 × tan. 30° (.5774) × .164 inch.

The foregoing follows since (looking say at Fig. 3) there are two triangles described by the movement of the lever 15 from the position shown in dotted lines (at 73) in Fig. 1 to the position shown in full lines in Fig. 1. One of these triangles is defined by closed line extending from the lever fulcrum 17 to the depressed or zero position (shown in Fig. 4) of the lower end of the gauge pin 28, from there to the elevated position of the lower end of the gauge pin 28, and back to the fulcrum. The other triangle is described by a closed line from the fulcrum to the depressed or zero position of the lower end of the indicator pin 29, from there to the elevated position of the lower end of the indicator pin 29, and back to the fulcrum. It will be understood that although the lever arm itself describes an arcuate movement about the fulcrum, the gauge pin and indicator pin ends slide on the land buttons 26 and 27 respectively, and these lower ends therefore define straight vertical lines in their movements on the axes 28a and 29a respectively. Since these two triangles just defined have the same angle at the fulcrum and since the gauge pin and indicator pin axes are parallel, the movements of the lower ends of these pins reciprocating on their axes 28a and 29a respectively will describe parallel lines and therefore by the laws of geometry the ratio of the lengths of these parallel lines described by the movements of the gauge and indicator pins will bear the same relation to each other as the distance from the fulcrum to the axis of one pin bears to the distance from the fulcrum to the axis of the other pin.

It is to be understood that if it be desired to measure distances from zero to greater than .190 inch, the adjusting screw knob 47 may be rotated to move the adjusting screw upwardly and permit a greater range of movement of the lever 15 from its lowermost or zero position to its uppermost position.

Operation of the device is as follows:

Turning first to Fig. 5 and assuming that it be desired to measure the diameter of a 60° recess 75 which may be a recess in say an article a portion of which is indicated at 76, the latter is placed over the rostrum 33 with the recess 75 of the article in vertical alignment with the conoidal upper end or nose 34 of the gauge pin 28. The article is then pressed down, with the nose 34 in the recess 75, until the end face 77 of the article 76 abuts the rostrum face 33. When this is done the lever 15 will have described a movement as indicated in Fig. 6 from its uppermost permissible position (permitted in this instance by the screw 47) as indicated at 74 downwardly to the position of the lever shown in full lines at 78. The lower broken line 73 again represents the position to which the lever 15 would have moved downwardly to cause the dial to register zero. The line 78 therefore represents the position short of zero of the lever to which it is moved by the article 76 to be measured, as in Fig. 5, against the upward urge of spring 39.

At the same time, the lower end of the gauge pin 28 would have stopped short of zero a distance indicated by the double arrowed line 81, and the lower end of the indicator pin point would have stopped short a distance indicated by the double arrowed line 82, against the downward urge of plunger 50.

Thus it will be understood that it is not the downward movement of the lever 15 which is measured (except indirectly by the dial instrument 51, but rather it is the position of the lever upwardly from its zero position which is directly measured, or, in other words, the distance which the nose of the gauge pin would rise if the lever 15 were moved first to the lowermost or zero position, then the article 76 placed over the bore 30 for the gauge pin with the recess 75 in register with the bore, and then the gauge pin allowed to rise under the influence of the spring 39 until stopped by the wall of the recess 75. If the article 76 moves the lever 15 downwardly from the possible upper limit of movement of the lever (as for example at 74 Fig. 6) to a position as shown at 78, this position would be incidental to movement of the lever 15 from the zero position as at 73 to the position as at 78. This would be represented by the rise of the nose 34 if it had a sharp apex, from a position flush with the rostrum surface 33 to a position coincident with the apex of the conical space of the recess 75. Since the nose 34 has a truncated apex but the truncation is exactly compensated for, the result is the same.

The distance (81) of rise from the zero position of the nose 34 is equivalent to the altitude of the triangle defined by a cross-section of the recess 75 (Fig. 5). The base of this triangle is the diameter 82a of the recess 75 at the end surface 77 of the article 76 which is coincident with the rostrum surface 33. This diameter 82a is equivalent to the distance 82 for the following reasons: By the laws of trigonometry 82a is equal to 1.1548 times the distance 81, i. e., 2×tan. 30° (.5774) times the distance 81. The gauge device is constructed, as already explained, so that the distance 82 is 1.1548 times the distance 81. Therefore, the distance 82a is equivalent to the distance 82, both being 1.1548 times the distance 81, i. e. the distance of relative movement of the gauge pin upwardly from zero. Since the dial registers the distance 82 it also registers at the same time the diameter 82a. Thus if the distance 81, or in other words the depth of the recess 75 should be .100 inch, then the distance 82a or the diameter of the recess at the face of the article would be .11548 inch, and the dial would directly indicate this measurement.

If however as shown in dotted lines in Fig. 5, and as shown in Fig. 7, the 60° conical recess in the article 76 should be deeper, as at 83, it would also be wider at the face of the cylinder. Consequently the nose 34 would go higher into the recess as at 84 and the gauge pin would move relatively upwardly from the zero position the distance as at 85, Figs. 5 and 7. This would cause the indicator pin to move relatively upward from the zero position a distance 86 equivalent to a diameter as indicated at 86a as shown in dotted lines in Fig. 5. If the distance 85 were, say, .150 inch then the distance 86 and 86a would be .173 inch, and the dial would so read.

As indicated in Fig. 8, the gauge device as here shown may be employed to measure the diameter as at 87 of a flared counterbore 88 (having a 60° taper or less) in a straight tube 89, provided the distance 87 is less than the over-all diameter of the gauge pin 28 so that the tube will abut the conical face of the nose 34 and provided further that the over-all diameter of the tube 89 be greater than the over-all diameter of the gauge pin so that the tube will abut the rostrum surface 33. Here the diameter 87 represents the base of a triangle the altitude of which is represented by the distance 87a, the ratio of which is as the ratio of 1.1548:1, and if the gauge pin 28 moves relatively from zero a distance of .100 inch into the tube 89 (i. e. the altitude 87a), then the diameter at 87 is .11548 inch.

As indicated in Fig. 9, the gauge device as here shown also may be used to measure the diameter of a straight bore 90 in a tube 91 provided the bore 90 be less than the over-all diameter of the gauge pin and the over-all diameter of the tube 91 be greater than the over-all diameter of the gauge pin. Here the diameter of the bore 90 represents the base 92 of a triangle the altitude of which is represented by the distance 93, the ratio of which again is as the ratio of 1.1548:1, and if the gauge pin 28 moves a distance of .100 inch into the tube 91, then the diameter of the bore 90 is .11548 inch, or the distance 92.

It will be apparent that if instead of 91 being a tube it were a rectangular member having a square opening instead of a cylindrical bore 90, the gauge device would also in the same way determine the cross-sectional dimension of the square opening.

If it were desired to work with conical recesses formed on angles other than 60°, the gauge device could be modified by changing the ratio of the lengths of lever arms 22 and 23 of the lever 15 and by changing the upper end of the gauge pin to correspond with the angle to be worked with.

As shown in Fig. 10, assuming an article 94 having a conical recess 95 on an 82° included angle is desired to be measured. Here the nose 96 of the gauge pin 97 would be similarly an 82° conoid. The lever 98 (Fig. 11) would have its gauge pin 97 on an axis 99 and its indicator pin on an axis 100. Here the ratio of the distance from the fulcrum 101 to the axis 99 with reference to the distance from the fulcrum 101 to the axis 100 would be as the ratio of 1:1.7386, the latter being 2 × tan. 41° (.8693), and 41° being one-half of the included angle 82°. The distance 102 would be to the distance 103 in the same ratio. Consequently, if the nose 96 moved relatively upwardly from the zero position the distance 102 or say .100 inch, then the dial instrument 51 would register .174 inch for the distance 103a, or the diameter of the recess 95 at the face 104 of the article 94.

Again if it were desired to work with recesses having a taper of 48°, for example, as shown in Fig. 12, the gauge pin 105 would have a nose 106 formed as a 48° conoid. Here the lever arms would be reversed in the sense that the gauge pin arm would be longer than the indicator pin arm, since the base of an isosceles triangle having an angle of 48° at its apex is shorter than the altitude. The ratio however of the base to the altitude is still twice the tangent of one-half the included angle. Consequently, for angles of 48° the ratio of the distance from the fulcrum 107 to the gauge pin axis 108 with reference to the distance from the fulcrum 107 to the indicator pin axis 109 would be as the ratio of 1:2 × tangent 24° (.4452) or .8904. Thus, if the gauge pin were to move a relative distance of .150 inch as at 110 (Figs. 12 and 13), the indicator pin would move a relative distance as at 111 (Fig. 13) and the dial instrument would register .133 inch, which would be the diameter 111a.

It will be understood that tubes having a flared counter-bore on an 82° taper or less could have the diameter of the counter-bore at the end of the tube measured by the present device modified as shown in Fig. 10, and that tubes having a flared counter-bore on a 48° taper or less could have the diameter of the counter-bore at the end of the tube measured by the present device modified as shown in Fig. 12. These modifications would function similarly to the function of the device as here specifically shown arranged for 60° or less angles as in Figs. 1 to 8 inclusive.

Furthermore, for measuring tubes having a straight bore as in Fig. 9, the modifications shown in Figs. 10 to 13 could be used just as well as the device as shown in Figs. 1 to 9 inclusive, provided only that the inner diameter of the bore be less than the over-all diameter of the gauge pin and that the outer diameter of the tube be greater than the over-all diameter of the gauge pin.

It will be understood that adaptations of the device to other angles than those here specifically illustrated may be readily made following the characteristic features of the present invention as here exemplified.

For example, the principle of utilizing a trigonometric function of an angle of the triangle in predetermining the arrangement of means for translating the distance of movement of a gauge pin along one element of the triangle other than the base of the triangle, as here illustrated, may be employed by having the gauge pin move along an element of the triangle other than the altitude, as here specifically described, and, instead, along one of the sides other than the base and which side would be the hypotenuse of a right-angle triangle of which the base would be one-half of the diameter to be measured and the ratio of the diameter to be measured to the hypotenuse would be as the ratio of twice the sine of one-half the included angle at the apex to 1.

The invention is not intended to be limited to details of construction shown for purposes of exemplification. Furthermore, it is not essential that all features of the device be used conjointly as various combinations or sub-combinations may at times be advantageously employed.

Such changes may be made as fall within the scope of the appended claims without departing from the invention.

The invention having been described, what is here claimed is:

1. A gauge device embodying a base, a lever carried by the base comprising a platen, a fixed fulcrum for said lever, said lever comprising integrally therewith as sides of said platen a gauge pin arm and an indicator pin arm, said arms being on the same side of said fulcrum rigid with said lever and having a common pivot point coincident with said fulcrum, a gauge pin and an indicator pin arranged slidably in the base in parallel and for reciprocation along their axes respectively, said pins each having an inner engagement with the gauge pin arm and indicator pin arm respectively by anti-friction contact on each arm whereby the pins maintain their parallelism while in reciprocation in engagement with the arms, an outer conoidal termination on the gauge pin arm for insertion into a recess to be measured, a dial plunger in spring pressed engagement with the indicator pin outer arm, a dial hand associated with said plunger for indicating the distance of travel of said plunger, and a spring urging the lever in a direction to reciprocate the pins in the base in a direction opposing the plunger.

2. A gauge device embodying a pivotable lever having a fulcrum, a test surface fixed in position with reference to said fulcrum, a gauge pin reciprocable through said surface and having a conoidal termination, an indicator pin being reciprocable in parallelism with the gauge pin in contact with said lever, said pins being reciprocable on axes respectively spaced from said fulcrum at distances related in length in the ratio of 1 to twice the trigonometric tangent of one-half the included angle at the conoidal termination, means urging the gauge pin point in one direction through said surface, and an instrument plunger urging the indicator pin in the opposite direction.

3. In a gauge device for measuring the diameters of recesses, means comprising a conoidal gauge pin enterable into the recess with its conoidal wall in engagement with the wall of the recess, a gauge instrument, and means for translating the distance of entrance of the gauge pin into the recess into measurement on the instrument of the diameter of the recess, said last mentioned means employing the principle of the trigonometric relationship of said diameter to said distance and including a pair of interconnected levers, the levers being related in length respectively in the ratio of 1 to twice the tangent of one-half the included angle at the apex.

4. In a gauge device of the class described for measuring the diameters of recesses, the combination comprising, a gauge pin having a conoidal termination, a gauge instrument, and lever means for translating the distance of entrance of the conoidal termination of the gauge pin into the recess into measurement on the instrument of the diameter of the recess, said lever means including a pair of rigidly connected lever arms having a common pivot and being of different lengths and extending in a common plane from their common pivot, one of said levers being arranged to be moved a predetermined distance in response to a given distance of movement of the gauge pin into the recess limited by the wall of the recess and the other lever being arranged to move a predetermined distance upon movement of the first mentioned lever to actuate the instrument, the levers being related in length in the ratio of 1 to twice the trigonometric tangent of an angle of a right-angle triangle one side of which is equal to the distance of movement of the gauge pin and another side of which is equal to one-half the diameter of the recess.

5. In a gauge device of the class described for measuring the diameters of recesses, the combination comprising, a gauge pin having a conoidal termination, a gauge instrument, and lever means for translating the distance of entrance of the conoidal termination of the gauge pin into the recess into measurement on the instrument of the diameter of the recess, said lever means including a pair of rigidly connected lever arms having a common pivot and being of different lengths and extending in a common plane in the same direction from their common pivot, one of said levers being arranged to be moved a predetermined distance in response to a given distance of movement of the gauge pin into the recess limited by the wall of the recess and the other lever being arranged to move a predetermined distance upon movement of the first mentioned lever to actuate the instrument, the levers being related in length in the ratio of 1 to twice the tangent of an angle of a right-angle triangle one side of which is equal to the distance of movement of the gauge pin and another side of which is equal to one-half the diameter of the recess.

6. In a gauge device of the class described for measuring the diameters of recesses, the combination, comprising, a gauge pin having a conoidal termination, a gauge instrument, and lever means for translating the distance of entrance of the conoidal termination of the gauge pin into the recess into measurement on the instrument of the diameter of the recess, said lever means including a pair of interconnected levers of different lengths, one of said levers being arranged to be moved a predetermined distance in response to a given distance of movement of the gauge pin into the recess limited by the wall of the recess and the other lever being arranged to move a predetermined distance upon movement of the first mentioned lever to actuate the instrument, the levers being related in length in the ratio of 1 to twice the tangent of an angle of a right-angle triangle one side of which is equal to the distance of movement of the gauge pin and another side of which is equal to one-half the diameter of the recess.

7. In a gauge device of the class described for measuring the diameters of recesses, the combination, comprising, a gauge pin having a conoidal termination, a gauge instrument, and lever means for translating the distance of entrance of the conoidal termination of the gauge pin into the recess into measurement on the instrument of the diameter of the recess, said lever means including a pair of interconnected levers of different lengths extending on the same side of a common fulcrum, one of said levers being arranged to be moved a predetermined distance in response to a given distance of movement of the gauge pin into the recess limited by the wall of the recess and the other lever being arranged to move a predetermined distance upon movement of the first mentioned lever to actuate the instrument, the levers being related in length in the ratio of 1 to twice the trigonometric tangent of an angle of a right-angle triangle one side of which is equal to the distance of movement of the gauge pin and another side of which is equal to one-half the diameter of the recess.

8. A gauge device embodying a lever, a fulcrum for said lever, said lever comprising a gauge pin arm and an indicator pin arm, said arms being rigid with said lever and of different lengths, the length of the indicator pin arm being to the length of the gauge pin arm as twice the tangent of a given angle to 1, a gauge pin and an indicator pin arranged in parallel and for reciprocation along their axes respectively, said pins each having an inner engagement with the gauge pin arm and indicator pin arm respectively by a sliding contact on each arm whereby the pins maintain their parallelism while in reciprocation in engagement with the arms, an outer conoidal termination on the gauge pin for insertion into a recess to be measured, a dial plunger in spring pressed engagement with the indicator pin outer end, a dial hand associated with said plunger for indicating the distance of travel of said plunger, resilient means urging the lever in a direction opposing the plunger spring, and means for setting the lever and pins at zero position.

9. A gauge device embodying a base, a lever pivoted on the base and comprising a platen, said lever including integrally therewith as sides of said platen a gauge pin arm and an indicator pin arm, said arms being of different lengths on the same side of said fulcrum rigid with said lever and having a common pivot point, a gauge pin and an indicator pin carried by the base responsive to movements of said arms respectively, and a dial instrument responsive to movement of the indicator pin, wherein the platen is perforated and the base carries a spring post passing through said perforations, and a spring presses at one end against the post and at its other end against the platen.

10. A gauge device embodying a lever, a fulcrum for said lever, said lever comprising a gauge pin arm and an indicator pin arm, said arms being rigid with said lever and of different lengths, the length of the indicator pin arm being to the length of the gauge pin arm as twice the tangent of a given angle to 1, a gauge pin and an indicator pin arranged in parallel and for reciprocation along their axes respectively, said pins each having an inner engagement with the gauge pin arm and indicator pin arm respectively by a sliding contact on each arm whereby the pins maintain their parallelism while in reciprocation in engagement with the arms, an outer conoidal termination on the gauge pin for insertion into a recess to be measured, a dial plunger in spring pressed engagement with the indicator pin outer end, a dial hand associated with said plunger for indicating the distance of travel of said plunger, resilient means urging the lever in a direction opposing the plunger spring, and an adjustable stop member for limiting movement of the lever in the direction it is urged by said resilient means.

HUGO A. HAMERLY.
SEYMOUR H. WRIGHT.

REFERENCES CITED

The following references are of record in the file of this patent:

UNITED STATES PATENTS

| Number | Name | Date |
|---|---|---|
| 181,809 | Williams | Sept. 5, 1876 |
| 1,290,434 | Walter | Jan. 7, 1919 |
| 1,485,154 | Aldeborgh | Feb. 26, 1924 |
| 1,648,428 | Stacy | Nov. 8, 1927 |
| 2,124,014 | Street | July 19, 1938 |
| 2,210,560 | Allen et al. | Aug. 6, 1940 |
| 2,304,460 | Kelleher | Dec. 8, 1942 |
| 2,399,012 | Farrance | Apr. 23, 1946 |

FOREIGN PATENTS

| Number | Country | Date |
|---|---|---|
| 591,332 | Germany | Jan. 19, 1934 |